May 20, 1952 R. ESNAULT-PELTERIE Re. 23,494

APPARATUS FOR THE RAPID VAPORIZATION OF WATER BY MEANS OF A SOLID COMBUSTIBLE

Original Filed Aug. 29, 1945 2 SHEETS—SHEET 1

INVENTOR
ROBERT ESNAULT-PELTERIE.
BY Kenyon & Kenyon
ATTORNEYS

INVENTOR
ROBERT ESNAULT-PELTERIE
BY
Kenyon & Kenyon
ATTORNEYS

Reissued May 20, 1952

Re. 23,494

UNITED STATES PATENT OFFICE 23,494

APPARATUS FOR THE RAPID VAPORIZATION OF WATER BY MEANS OF A SOLID COMBUSTIBLE

Robert Esnault-Pelterie, Geneva, Switzerland, assignor to Spladis Societe Pour L'Application D'Inventions Scientifiques, Luxemburg, a firm of Luxemburg Original No. 2,526,339, dated October 17, 1950, Serial No. 613,390, August 29, 1945. Application for reissue December 11, 1951, Serial No. 260,964

6 Claims. (Cl. 122—169)

Figure 1:
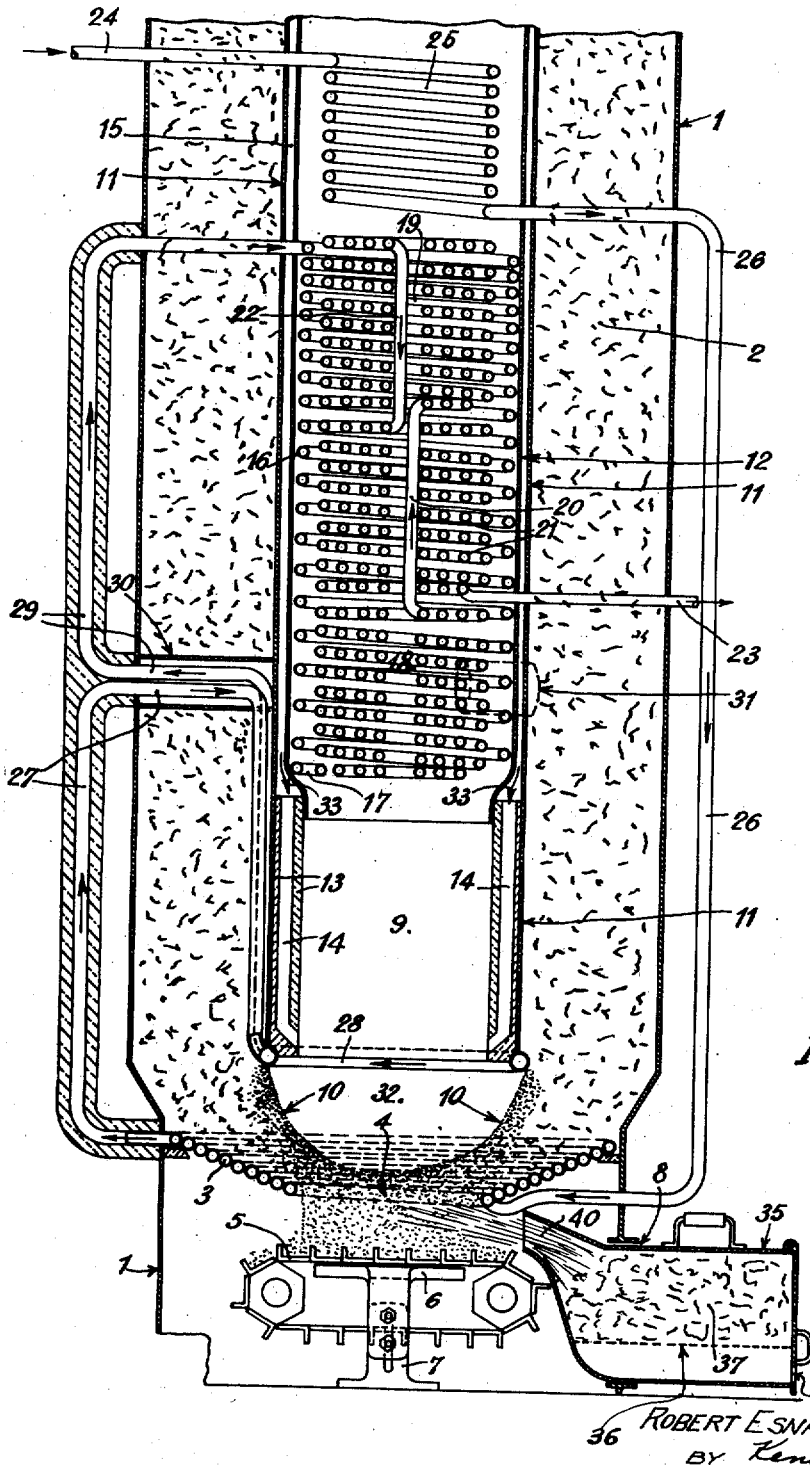

Matter enclosed in heavy brackets [ ] appears in the original patent but forms no part of this reissue specification; matter printed in italics indicates the additions made by reissue.

In boilers for the rapid *vaporization* [vaporisation] of water that are in current use, the quantities of water and fuel supplied to the boiler are regulated according to the amount of steam required. Such a regulation of the fuel postulates that the latter should be fluid and thus the use of solid fuel is precluded.

An object of the present invention is to allow the use of solid fuel for such type boiler. The invention relates to an apparatus for the *rapid* [instantaneous] vaporization of water by means of a solid fuel. This apparatus is characterized in that it comprises an air-supply device surrounded by a fuel tank and having below it a space forming the fire-room into which the fuel slides down and forms a circular crumbling crater, a system of tubes fed with water and situated *in* [on] part of the course followed by the gases of combustion, a heat-insulated combustion chamber, surrounded by the air-supply device, situated between the said crater and the tube system, and of sufficient volume to give the gases coming from the crater time to complete their combustion reactions before reaching the tube system, and means for simultaneously regulating the delivery of water supplied to the said system and the delivery of combustion air according to the amount of steam required, the air-supply device directing the pre-heated air in such a way that it licks the surface of the crater from top to bottom and in a general whirling movement which is *imparted* [propagated] to the exhaust gases.

Experience shows that, thanks to this arrangement, the intensity of the combustion follows[,] in a faithful and immediate manner, the variations in the supply of the combustion air and that it takes place with a ratio of carburetting that hardly varies; consequently, the regulation of the air alone produces an immediately responsive regulation of the supply of heat generated and, in correlation, of that of the steam.

To obtain at any moment the supply of steam required, it suffices, then, to ensure that the combustion air and the water are delivered in a given ratio and to regulate these connected deliveries of combustion air and water by making them vary practically proportionally at any moment according to the amount of steam required. The water supply may be regulated according to that of the air or, inversely, that of the air according to that of the water.

The two fluids air and water may with advantage be made to effect their courses in stages situated athwart those regions where the heat is liable to escape from the apparatus towards the outside, so as to intercept it and then to restore it to the apparatus. These courses should, then, be contrived in such a way that the said fluids reach progressively hotter regions in the measure in which their own temperature increases through this recuperation.

The fuel, which slides down into the fire-room by gravity, may with advantage be heated, thus dried and even be more or less pre-distilled before reaching the fire-zone.

The means for simultaneously regulating the water supply and the combustion-air supply may be, for example, a gear-pump for the water and a Root's ventilator for the air, or a piston-pump for the water and a Root's ventilator for the air, or, again, a centrifugal pump for the water and also a centrifugal fan for the air: the deliveries from these pumps or fans are determined respectively by the resistance to the flow of the water in the tube system and to the flow of the gases in the conduits through which they flow and depending on the speed at which these pumps or fans are made to revolve.

Figure 2:
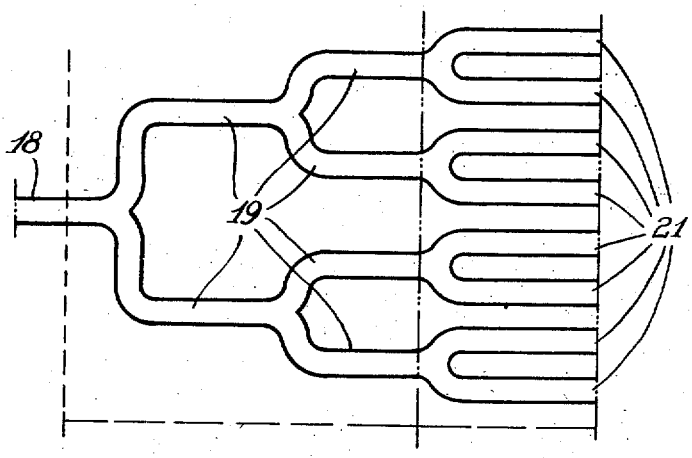
Figure 3:
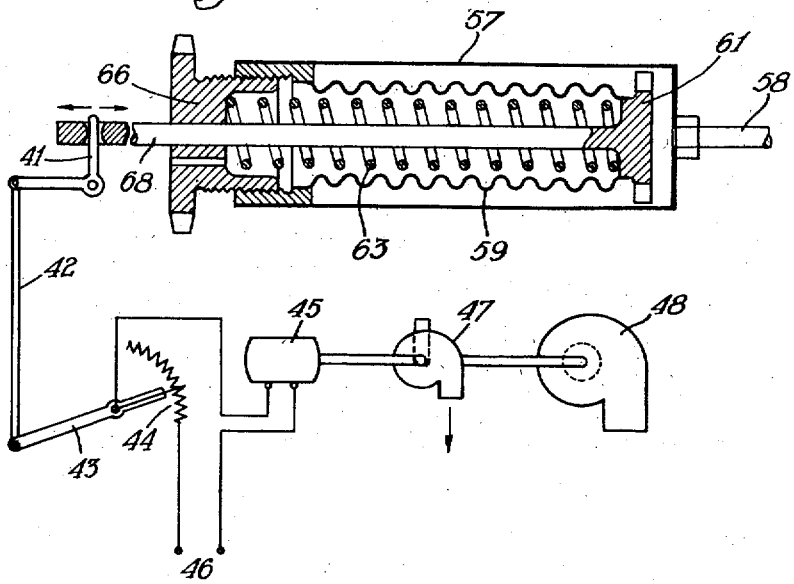

In the appended drawing Fig. 1 represents in vertical cross-section, as an example and diagrammatically, one embodiment of an apparatus in accordance with the invention. Fig. 2 is a diagrammatical detail view of the water tubes and Fig. 3 illustrates a manometric device for controlling the operation of the apparatus.

This apparatus comprises a receptacle 1, of a general cylindrical shape, the axis of which is vertical. This receptacle may be filled with broken-up solid fuel 2 (wood, coke, coal, peat, brown coal, etc.) and thus constitutes a fuel tank. It presents at its lower part a sole 3 of a truncated-cone shape formed by a tube wound in a conical spiral, with joined windings, the whole of which forms one of the recuperator stages mentioned above. A passage 4 is left open in the centre of this spiral to allow the fuel and ashes to pass through. An evacuating chain 5 is supported by a tray 6 situated below the passage 4 and borne by a pillar 7. The distance between the tray 6 (and consequently the upper part of the chain 5) and the passage 4 is adjustable. The chain is worked by a device not shown. Owing to the movement of the chain 5, the ashes formed over the passage 4 can fall to the bottom of the receptacle 1 so as to be evacuated through the opening 8.

In the central region of the receptacle 1 is fitted a body of a general cylindrical shape, the lower part of which constitutes a combustion chamber 9, below which the combustible forms a circular crumbling crater 10. The cylindrical body is constituted in its main upper part by two concentric[al] shells 11 and 12 *of* [in] sheet-metal and is internally protected in its lower part by a lining 13 of refractory material forming the wall of the combustion chamber 9.

The lining 13 encloses, *within* [in] its thickness, conduits 14 and the materials of which it is composed may preferably be chosen so that its inner cylindrical half is a better conductor of heat than its outer cylindrical shaft. The air intended to sweep the crumbling crater 10 is drawn in at the top of the cylindrical body 11—12 and passes into the space 15 between the two shells 11 and 12, thence into the conduits 14; in this space 15 the air performs another of the aforementioned recuperator stages. The lower extremities of the conduits 14 are directed downwards and are laterally inclined so that the air which issues from them sweeps over the crumbling crater 10 in a general whirling movement. The combustion gases then rise through the central cavity formed by the cylindrical body 12.

In this central cavity and situated near the inner face of the shell 12 is helical tube 16 representing the third recuperator stage, the latter *having non-contiguous coils* [being discontinuous] owing to the fact that the pitch of its windings gradually increases from top to bottom. The lower end of the tube 16 communicates at 17 with a system of tubes.

This system *of tubes* is divided up into three sections connected in series; the lowest one, 18, called the initial vaporization section, receives the water coming from the tube 16; the uppermost section 19, called the vaporization section, receives, through the tube 20, the water and/or the steam coming up from the section 18, and the intermediate section 21, called the superheating section, receives through the tube 22 the steam issuing from the region 19. The tubes of this system are split up into increasing numbers of tubes as shown diagrammatically in Fig. 2, thus offering a gradually increasing passage cross-section as the water vaporizes and as the amount of steam increases. The forks in each set of tubes are very long so as to deviate the fluid in circulation as little as possible with a view to reducing the loss of pressure. If necessary, the diameter of the tubes may gradually increase from one set of tubes to the next set.

The superheating section 21 ends in a steam collector 23, the cross-section of which is actually greater than shown.

A tube 24, situated at the top of the receptacle 1, feeds the apparatus with water through one of the means described above. This tube forms a coil 25, it also constitutes a recuperator stage in that part of the cylindrical body which is situated above the tube system. This coil 25 is connected, through a tube 26, to the sole 3, which is connected, through a tube 27, to a water circulation ring 28, provided at the base of the shell 11. The water, having flowed around this case, is led by a tube 29 to the top of the helical tube 16. The tubes 27 and 29 cross the fuel tank in a streamlined guard 30 which is high and narrow so as not to hinder the fall of the fuel. Two other similar guards 31 are placed at 120° distance round the cylindrical body with the purpose of keeping the latter, towards its lower part, in place in the receptacle 1.

Between the water-supply tube 24 and the steam collector 23, the water and/or the steam pass through the different parts of the apparatus in the following order: coil 25, tube 26, sole 3, tube 27, ring 28, tube 29, helical tube 16, tube section 18, tube 20, tube section 19, the tube 22, tube section 21, to arrive finally at the steam collector 23.

The apparatus described works as follows:

The broken up fuel 2 contained in the receptacle 1 slides down by gravity as it is gradually consumed into the fire-room 32 and forms the crumbling crater 10. The ashes fall through the passages 4 under the influence of the movements of the chain 5 and *are removed* [can be evacuated] through the opening 8.

The air which has to sweep over the crumbling crater 10 is drawn through the top of the apparatus into the space 15 through which it flows downwards. This air then enters the conduits 14 of the refractory lining 13 as shown by the arrows 33, to issue from them into the fire-room 32, where it sweeps in a general whirling movement over the surface of the crumbling crater 10. This sweeping air, progressively heated while flowing through the space 15, takes on, in the conduits 14, a high temperature owing to the heat transmitted by the combustion gases which rise in a counter-current inside the combustion chamber 9; the heat thus acquired is brought back into the fire-room 32, where it raises the temperature of *and* [an] improves the combustion.

Experience shows that, in these conditions, the fuel burns entirely *into* [in] $CO_2$ and $H_2O$, so that the heat generated is practically proportionate to the quantity of air supplied.

The combustion gases issuing from the fire-room rise through the combustion chamber 9, the volume of which is sufficient for them to complete in it their combustion reactions; pursuing their course in the cylindrical body 12, they then flow successively through the initial vaporization section 18, the superheating section 21 and the vaporization section 19, and finally that of the water-heating coil 25, which completes the proper exhaustion of their residual heat.

The feed-water for the apparatus is supplied through the tube 24 in a controlled output. It flows downwards into the coil 25, then into the sole 3, then *reaches* [gains], through the tube 27, the circulation ring 28, where it is further heated while at the same time cooling that part of the shell 11 which is *closest* [close] to the crater 10. Having risen through the tube 29, it afterwards flows down into the helical tube 16, where its heating is completed while at the same time it *protects* [is protecting] the shell 12 against overheating by the combustion gases. The pitch of the windings of this tube gradually increases from top to bottom; the degree of this increase is determined by the nature of the combustible to be burned in the apparatus. *The rate of change of the pitch* [It] will be correspondingly less as the calorific power of the combustible is higher, in order that the air circulating in the space 15 shall not reach an excessive temperature. The length of the tube 16 is such that the water which passes through it remains almost completely in the liquid state. This water, thus heated, passes at 17 into the bottom of the tube system and rises through the section 18, where it begins to vaporize; it then flows, through the tube 20, to the foot of the section 19, through which it travels upwards and vaporizes for the greater part. The moist steam thus produced is brought back through the tube 22 to the top of the section 21, through which it travels downwards, being dried and then superheated. As the fluid passing through the pipe system 17 gradually expands as it vaporizes, the passage open to it must gradually increase in cross-section; that is why it has been previously indicated that the original tube at the foot of the section 18 is later split up into successive sets of tubes. The steam generated finally reaches the collector 23. The speed at which the fluid flows through the tube system is everywhere kept high enough for the water and steam to remain mixed; however, it is seen that, in the course followed by the water and steam, the precaution has been taken that the parts *traversed downwardly* [gone through downwards]—i. e., the coil 25, the tube 26, the descending part of the tube 27, the helical tube 16—are gone through only by the water not yet vaporized or containing, towards the foot of the tube 16, only a very slight portion of steam, the speed of the flow being sufficient to carry along this slight portion with the water.

The sections 18 and 19, where the vaporization really takes place, as well as the tube 20 which connects them, are, on the contrary *traversed upwardly* [gone through upwards], so that steam pockets liable to cause explosions cannot form there.

The vaporization being practically complete at the top of the section 19, there descends into the tube 22 steam containing only a suspension of water globules; the drying of this steam is completed and it is superheated in the section 21, also *traversed downwardly* [gone through downwards]. In the collector 23 the steam is not only dry but also superheated.

The kindling and rekindling of the apparatus may be advantageously effected by means of a fire-box 35 fitted with a grate 36 on which more or less small pieces of wood 37 have been laid. This fire-box being introduced into the opening 8, a *partial vacuum* [depression] is created inside the apparatus by forced suction of the gases; the *entry* [arrival] of air into the space 15 is shut off so as to *compel* [oblige] the combustion air to enter through the aperture 39 in the fire-box 35; and the wood 37 is ignited. The flame is transmitted through an extension 40 to the fuel resting on the evacuating chain 5, the fire-box may then be withdrawn, the opening 8 closed and the normal air intake restored through the space 15. Simultaneously with these operations, the water circulation is set going. When the fire is burning thoroughly, the pressure rises in the tube system. As, at the beginning of the operation, water and not steam will be evacuated by the collector 23, this water should not be *driven* [directed on] to the apparatus using the steam (piston engine, turbine, etc.), but should be allowed to escape or [it may be] brought back to the feed-pump through the condenser. For example, for this purpose, one or several safety-valves (not shown) forming a *return* [short] circuit may be provided between the steam outlet 23 and the condenser. The apparatus using steam being cut off, the water and the steam will travel round a closed cycle: apparatus according to the invention, safety-valves, condenser, feed-pump and said apparatus. As soon as the last-named has attained its proper temperature, the apparatus using the steam will be put into circuit. The safety-valve or valves will then close automatically and function only occasionally to short-circuit the cycle of steam in the case where the pressure exceeds the normal working level.

If the apparatus using the steam has an open exhaust, the safety-valve or valves should lead directly into the open air.

The regulation of the supplies of water and combustion air is such that it should first ensure a practically constant ratio between the water supply and the air supply, this ratio to be determined according to the particular characteristics of each apparatus considered, and thence an amount of water and air corresponding to the instantaneous requirement in steam. In other words, the supplies of water and air being regulated in relation to each other, these two connected supplies are, at any moment, regulated in accordance with the power required—i. e., with the quantity of steam absorbed.

With this object, a manometric diaphragm or a corrugated metallic tube 59 (Fig. 3) may be used which would receive on one of its faces the pressure taken near the collector 23.

For example, as shown in Fig. 3, a corrugated tube 59 is mounted in a cylinder 57 connected by a pipe 58 with the steam collector 23, while the interior of the tube 59 is connected to the atmosphere. The corrugated tube 59 is provided with a cap 61 on which a spring 63 bears with a pressure adjustable by means of a screwed nut 66.

The pressure of the steam compresses the pleated tube 59 and the spring 63 until it balances the counterpressure exerted thereby. To the cap 61 is secured a rod 68 adapted to act through levers 41, 42 and 43 on a control for example an electric rheostat 44, which in its turn acts on the control of a variable-speed motor 45 fed from a current supply 46 driving simultaneously the air-pump 47 and the water-pump 48 so as to govern their deliveries without practically changing the ratio between them. The action of this group of controls would be to lessen the water supply in the case of a rise in pressure at 23 and to increase it in the case of fall in pressure. All these controls may be of any current type; they are contrived in such a manner that their action will cease as soon as the pressure at the connector 23 resumes its normal value either by rising or by falling.

As can readily be understood, the working of the apparatus in accordance with the invention is very pliable in the sense that it can supply per unit of time amounts of steam which can vary within large limits. It is sufficient to control the combustion air supply and the water supply to obtain the delivery of steam desired at the desired temperature and at the desired pressure; this control may with advantage be automatic. Owing to its entirely tubular construction, this apparatus is able to supply steam at very high pressure (for example, 1400 lb. to the sq. inch) and to function with a very high boiling temperature [(]for example, 300° C. (*572° F.*)[=600° F.)] without prejudice to the superheating of this steam.

The apparatus described may be modified in various ways, especially as regards the form and arrangement of the tube system, the number, length and cross-section of the tubes, etc. The form of construction which has been described relates to a specification for which a large space in height is available, as is the case in thermal, electric and other stations, or in large ships.

What I claim is:

1. A rapid vaporization steam boiler adapted to be fired with solid lumpy fuel comprising a receptable for lumpy fuel, a substantially vertical central shaft arranged in said receptable, tubes adapted to be fed with water to be vaporized arranged within said shaft, a refractory lined substantially vertical shaft within said receptacle aligned with said first-named shaft and below the latter whose upper end opens into the lower end of said first-named shaft and whose lower end opens into a fire room in which said fuel forms a crumbling crater, said refractory lined shaft defining an intermediate combustion chamber, an inner concentric shell within said first-named shaft surrounding said tubes and defining an air duct with said shaft, primary air heating ducts in the refractory lining of said second shaft forming a straight prolongation of said first-named air duct for first preheating and then heating air in its course to said fire room, said second-named air ducts having outlets directed to cause the heated air to lick the crumbling crater formed by the fuel with a general whirling movement, said intermediate combustion chamber lying entirely below the tube-containing portion of said first-named shaft, and said inner concentric shell extending in *axial* [straight] prolongation of the wall of said intermediate combustion chamber.

2. An apparatus according to claim 1 in which a protective water circulating tube is provided at the base of said refractory *lined* [line] substantially vertical shaft and above said fireroom.

*3. An apparatus as in claim 1 wherein said tubes comprise a system of three superposed tube sections including an initial vaporization section lowermost in the system, a vaporization section uppermost in the system, and a superheating section intermediate the other two sections, said sections being serially connected such that the water flows successively upwardly through the initial vaporization section, then upwardly through the second named vaporization section, and then downwardly through the superheating section.*

*4. An apparatus as in claim 1 wherein said tubes comprise a system of three superposed helical tube sections including an initial vaporization section lowermost in the system, a vaporization section uppermost in the system, and a superheating section intermediate the other two sections, a helical recuperator tube surrounding said system and a helical recuperator coil above the system, said coil, tube and sections being serially connected such that the water flows successively downwardly through the recuperator coil, then downwardly through the recuperator tube, then upwardly through the initial vaporization section, then upwardly through the second named vaporization section, and then downwardly through the superheating section.*

*5. A rapid vaporization steam boiler adapted to be fired with solid lumpy fuel comprising a receptacle for lumpy fuel, a substantially vertical central shaft arranged in said receptacle, tubes adapted to be fed with water to be vaporized arranged within said shaft, said tubes comprising a system of three superposed tube sections including an initial vaporization section lowermost in the system, a vaporization section uppermost in the system, and a superheating section intermediate the other two sections, said sections being serially connected such that the water flows successively upwardly through the initial vaporization section, then upwardly through the second named vaporization section, and then downwardly through the superheating section, a combustion chamber in the lower part of the central shaft below which fuel dropping down around the shaft forms a crumbling crater, and means defining a duct around said shaft for directing air downwardly along the shaft to the crater—all whereby the flow of air, water and fuel is downward except the flow of water in the initial vaporization and vaporization sections so as to tend to restore escaping heat energy picked up by the air, water and fuel to the portions of the boiler where it may be used.*

*6. A rapid vaporization steam boiler adapted to be fired with solid lumpy fuel comprising a receptacle for lumpy fuel, a substantially vertical central shaft arranged in said receptacle, tubes adapted to be fed with water to be vaporized arranged within said shaft, said tubes comprising a system of three superposed helical tube sections including an initial vaporization section lowermost in the system, a vaporization section uppermost in the system, and a superheating section intermediate the other two sections, a helical recuperator tube surrounding said system and a helical recuperator coil above the system, said coil, tube and sections being serially connected such that the water flows successively downwardly through the recuperator coil, then downwardly through the recuperator tube, then upwardly through the initial vaporization section, then upwardly through the second named vaporization section, and then downwardly through the superheating section, a combustion chamber in the lower part of the central shaft below which fuel dropping down around the shaft forms a crumbling crater, and means defining a duct around said shaft for directing air downward along the shaft to the crater—all whereby the flow of air, water and fuel is downward except the flow of water in the initial vaporization and vaporization sections so as to tend to restore escaping heat energy picked up by the air, water and fuel to the portions of the boiler where it may be used.*

ROBERT ESNAULT-PELTERIE.

REFERENCES CITED

The following references are of record in the file of this patent or the original patent:

UNITED STATES PATENTS

| Number | Name | Date |
|---|---|---|
| 851,030 | Reck | Apr. 23, 1907 |
| 994,830 | Fortune | June 13, 1911 |
| 1,189,429 | Clarkson | July 4, 1916 |
| 1,196,145 | Pinguely | Aug. 29, 1916 |
| 1,627,399 | Messler | May 3, 1927 |
| 1,975,096 | Fletcher | Oct. 2, 1934 |
| 1,998,329 | Mechelke | Apr. 16, 1935 |
| 2,011,423 | Sheldon | Aug. 13, 1935 |
| 2,170,344 | Dickey | Aug. 22, 1939 |
| 2,201,621 | La Mont | May 21, 1940 |
| 2,423,997 | Ruegg | July 15, 1947 |

FOREIGN PATENTS

| Number | Country | Date |
|---|---|---|
| 394 | Sardinia | June 30, 1857 |